United States Patent
Tran et al.

(10) Patent No.: US 12,391,386 B2
(45) Date of Patent: Aug. 19, 2025

(54) NON-INTRUSIVE AND EXTENDABLE ARMREST

(71) Applicant: Safran Seats USA LLC, Gainesville, TX (US)

(72) Inventors: Anthony Tran, Huntington Beach, CA (US); Romain Tranier, Costa Mesa, CA (US); Amen Omoragbon, Westminster, CA (US); Nguyen Foek Le, Arlington, TX (US)

(73) Assignee: Safran Seats USA LLC, Gainesville, TX (US)

( * ) Notice: Subject to any disclaimer, the term of this patent is extended or adjusted under 35 U.S.C. 154(b) by 198 days.

(21) Appl. No.: 18/266,359

(22) PCT Filed: Dec. 11, 2020

(86) PCT No.: PCT/US2020/064679
§ 371 (c)(1),
(2) Date: Jun. 9, 2023

(87) PCT Pub. No.: WO2022/125117
PCT Pub. Date: Jun. 16, 2022

(65) Prior Publication Data
US 2024/0101259 A1    Mar. 28, 2024

(51) Int. Cl.
*B64D 11/06*    (2006.01)
(52) U.S. Cl.
CPC .................. *B64D 11/0644* (2014.12)
(58) Field of Classification Search
CPC ........ A47C 7/543; B60N 7/753; B60N 2/777; B64D 11/0644; B64D 11/0646
See application file for complete search history.

(56) References Cited

U.S. PATENT DOCUMENTS

| 1,500,524 | A | | 7/1924 | Phillips |
| 5,433,509 | A | * | 7/1995 | Hotary .................. B60N 2/767 297/411.33 |
| 9,468,302 | B2 | * | 10/2016 | Negusse ............ B64D 11/0646 |
| 9,828,101 | B2 | | 11/2017 | Shih |

(Continued)

FOREIGN PATENT DOCUMENTS

| EP | 3971087 A1 * | 3/2022 | ......... B64D 11/0644 |
| JP | 2017043229 A | 3/2017 | |
| KR | 102151953 B1 | 9/2020 | |

OTHER PUBLICATIONS

International Patent Application No. PCT/US2020/064679, International Search Report and Written Opinion, dated Aug. 9, 2021.

*Primary Examiner* — Milton Nelson, Jr.
(74) *Attorney, Agent, or Firm* — Kilpatrick Townsend & Stockton LLP

(57) ABSTRACT

Described are armrests for positioning between passenger seats having a base component with a divider extending upward from an upper surface of the base component and at least one adjustable component movably coupled to the base component. In a retracted position, the adjustable component and divider are arranged to form a non-intrusive barrier between passengers' arms. In an extended position, the divider is arranged to form the non-intrusive barrier between passengers' arms, while the adjustable component is arranged to extend a width of the armrest.

17 Claims, 9 Drawing Sheets

(56) References Cited

U.S. PATENT DOCUMENTS

| | | | |
|---|---|---|---|
| 9,986,841 B2 | 6/2018 | McMillan | |
| 2010/0244478 A1* | 9/2010 | DePue | B60N 2/773 |
| | | | 296/37.8 |
| 2018/0290572 A1 | 10/2018 | Shaw, Jr. | |

* cited by examiner

NON-INTRUSIVE AND EXTENDABLE ARMREST

FIELD OF THE INVENTION

The invention relates to aircraft seating for any seat class and flight range where a shareable armrest is located between passenger seats, and can be further applicable to any other field where seats are placed side by side with a shareable armrest located between passenger seats including but not limited to buses, trains, movie theaters, and the like.

BACKGROUND

Common carriers, such as passenger airlines, bus lines, train lines, and passenger vehicles frequently include passenger seats. In many cases, such as with passenger aircraft, and especially in Economy cabin, passenger seats are arranged adjacent to each other with a single armrest located between two passenger seats. These armrests therefore become shareable armrests, which can result in both tension between passengers over fair share and concern about germs and virus transmission.

U.S. Pat. No. 9,828,101 describes an armrest structure having two support plates that pivot between a vertical orientation and a horizontal orientation. In the vertical orientation, the support plates are positioned adjacent a central wall to form a conventional shared armrest structure for use during taxi, take-off, and landing ("TTL") conditions of a flight. In the horizontal orientation, the support plates are positioned at a 90 degree angle to the central wall to create a divided armrest for use during non-TTL portions of the flight. While the central wall provides a physical barrier between passengers' arms and an equivalent and fair distribution of armrest space, it fails to provide any of these benefits during TTL conditions or at any other time when the support plates are in the vertical position (such as for a high percentile passenger having a large waist where the support plate is unable to rotate downward into the horizontal position). Moreover, even in the horizontal orientation, the available surface to support a passengers' arm is limited to the horizontal surface of the support plate only.

U.S. Pat. No. 9,986,841 describes an armrest structure having a physical barrier between passengers' arms that utilizes a pair of concave surfaces that join along a central line along the armrest structure. While this structure provides a physical barrier between passengers' arms and an equivalent and fair distribution of armrest space, it fails to provide any means of extending the support surface as desired by the passenger during non-TTL conditions. As a result, passengers may experience a feeling of not having enough space for resting their arms.

To address these issues, it is desirable to create an armrest that includes a non-intrusive design that maintains a physical barrier between passengers' arms throughout the flight, including taxi, take-off, and landing ("TTL") conditions. The goals of such a design are to define equivalent and fair armrest spaces for each passenger sharing the same armrest, to avoid intrusion into a passenger's private space, and to avoid contact between passengers as much as possible, and to accomplish these goals during all the phases of a flight. The non-intrusive armrest is responsive to complaints and demands about unfair sharing of current armrest designs because it provides passengers with the ability to delimit and possess their own space. Moreover, as a direct consequence of the COVID-19 pandemic, the non-intrusive armrest avoids arm/prevents physical contact between passengers as much as possible and at all times during a flight, thus reducing a potential spread of germs between passengers.

Furthermore, it may be desirable that such a non-intrusive armrest design can be extended with a physical extension of the armrest to provide additional support for a passenger's arm during the flight, particularly outside of TTL conditions. Such an extension may have a concave shape, which provides a greater support surface for a passenger's arm by contouring to a curvature of a passenger's arm, rather than providing a flat surface that provides minimal contact points for a passenger's arm.

Such a design can be used in any seating configuration and any aircraft class seating where passenger seats are placed side by side and having a single armrest positioned between two passenger seats. For example, such an armrest could also be used in other fields where seats are placed side by side with an armrest to be shared between people, such as buses, trains, movie theatres, etc.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an armrest for a passenger seat comprises a base component comprising two sides and an upper surface, a divider extending upward from the upper surface of the base component, and at least one adjustable component movably coupled to the base component, the at least one adjustable component comprising a curved retracted support surface and an extended support surface. In a retracted position, the at least one adjustable component is positioned so that the curved retracted support surface extends between an upper end of the divider and an edge of one of the two sides of the base component. In an extended position, the at least one adjustable component is positioned so that the extended support surface is positioned adjacent to one of the two sides of the base component.

According to some embodiments, the extended support surface is substantially flat, may be arranged to substantially align with the upper surface of the base component, and/or may extend a width of the base component by at least 1 inch. In some embodiments, the curved retracted support surface and the extended support surface are configured to support a passenger's arm at approximately the same height when a passenger is seated in the passenger seat and resting his or her arm on the armrest. Furthermore, the divider may be arranged to form a non-intrusive barrier between passengers' arms when the armrest is positioned between two passenger seats and passengers are seated in the two passenger seats and resting their arms on the armrest.

According to certain embodiments of the present invention, an armrest is positioned between two passenger seats. The armrest may comprise a base component comprising a divider extending upward from an upper surface of the base component and two adjustable components, each adjustable component movably coupled to the base component and configured to convert between a retracted position and an extended position. In the retracted position, two adjustable components and the divider are arranged to form a non-intrusive barrier between passengers' arms when passengers are seated in the two passenger seats and resting their arms on the armrest. In the extended position, the divider is arranged to form the non-intrusive barrier between the passengers' arms when the passengers are seated in the two passenger seats and resting their arms on the armrest.

According to certain embodiments of the present invention, an armrest is positioned between two passenger seats. The armrest may comprise a base component comprising two sides and an upper surface and two adjustable components, each adjustable component movably coupled to the base component and configured to convert between a retracted position and an extended position. In the retracted position, two adjustable components are arranged to form a non-intrusive barrier between arms of passengers when passengers are seated in the two passenger seats and resting their arms on the armrest. In the extended position, the two adjustable components are positioned so that an extended support surface of each of the two adjustable components is positioned adjacent one of the two sides of the base component.

DETAILED DESCRIPTION

Figure 1:
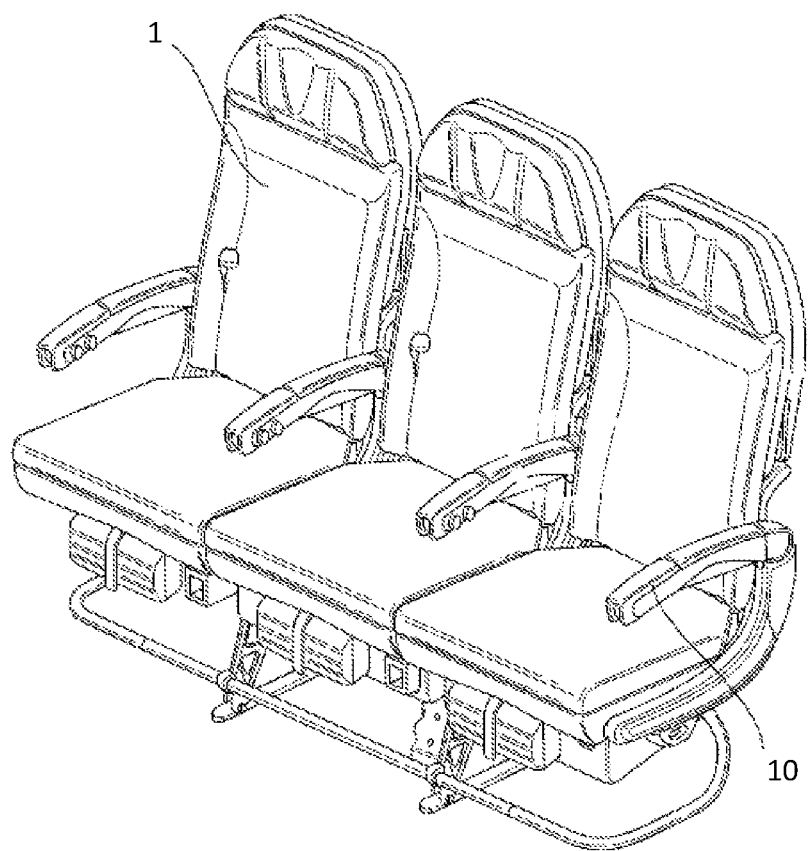
FIG. 1 is a perspective view of multiple seats with shared armrests, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments of the present invention, as illustrated in FIGS. 1-17, a passenger seat 1 may comprise a non-intrusive and extendable armrest 10, which in turn comprises a base component 12 and two adjustable components 14.

In some embodiments, as shown in FIGS. 2-9 and 12-15, the base component 12 may further comprise a stationary divider 15 that is positioned to evenly divide the armrest 10 between the two passenger seats. The divider 15 is a vertical wall that extends approximately along a centerline of the armrest 10. In further embodiments, the divider 15 may have a curved, angular, or other design or other configuration that evenly divides the armrest 10 surface between the two passenger seats.

As shown in FIGS. 2-17, each adjustable component 14 comprises a retracted support surface 16 and an extended support surface 18. Each adjustable component 14 may be movably coupled to a recessed area 20 within the base component 12. In certain embodiments, the adjustable component 14 is configured to move between a retracted position 22 (as shown in FIGS. 2, 6, 9-10, 12, 14, 16) and an extended position 24 (as shown in FIGS. 4-5, 8, 11, 13, 15, 17). For example, as shown in FIGS. 2-17, each adjustable component 14 is pivotably coupled to the base component 12 at a pivot location 26. In other embodiments, the adjustable component 14 may be movably coupled to the base component 12 using a slide, a spring, or any other joining mechanism that provides for linear or rotational movement of the adjustable component 14 relative to the base component 12.

Figure 2:
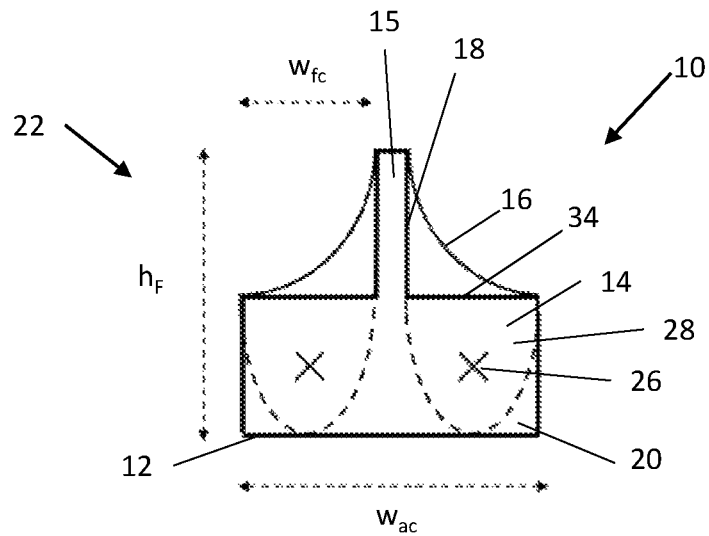
FIG. 2 is an end view of a shareable armrest with both adjustable components in a retracted position, according to certain embodiments of the present invention.
Figure 3:
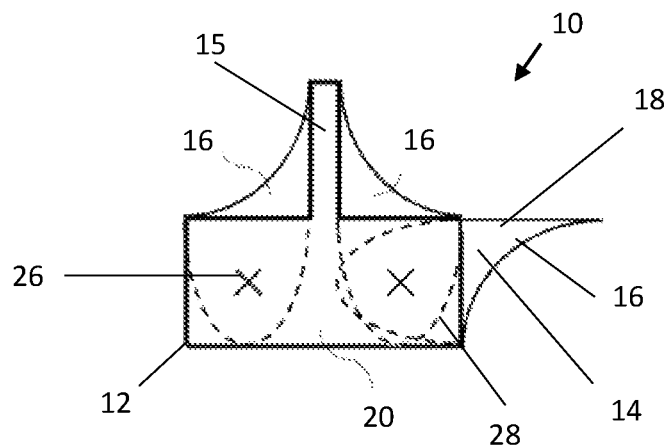
FIG. 3 is an end view of the shareable armrest of FIG. 2 with one adjustable component in a retracted position and one adjustable component in an extended position.
Figure 6:
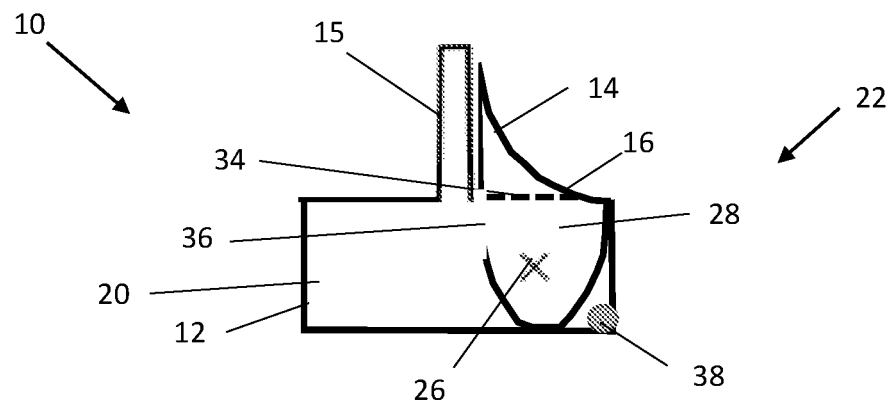
FIG. 6 is an end view of a shareable armrest with one adjustable component in a retracted position, according to certain embodiments of the present invention.
Figure 9:
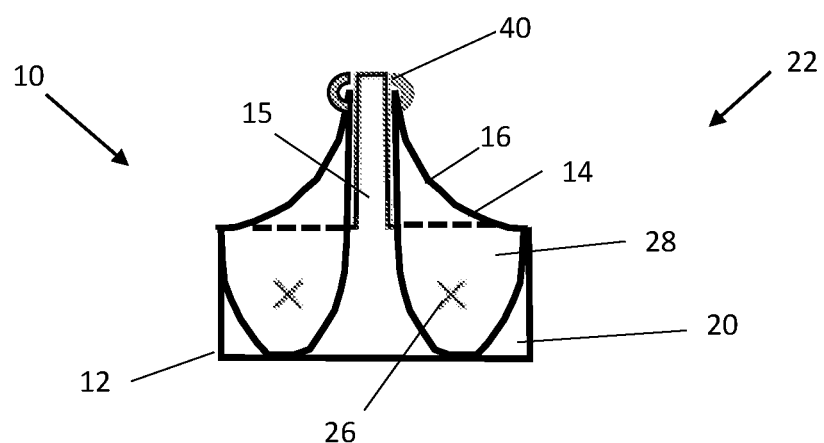
FIG. 9 is an end view of a shareable armrest with both adjustable components in a retracted position and secured to a divider, according to certain embodiments of the present invention.

In the retracted position 22, according to some embodiments as shown in FIGS. 2, 6, 9 the adjustable component 14 may be oriented relative to the base component 12 so that the retracted support surface 16 is presented as the contact surface for a passenger's arm, and the extended support surface 18 is positioned adjacent the divider 15.

In certain embodiments, as shown in FIGS. 2, 6, 9-10, 14, and 16, the retracted support surface 16 has a concave configuration, which provides a larger support surface for a passenger's arm than a conventional flat armrest surface by better contouring to the rounded shape of the arm. The concave configuration is particularly beneficial in the retracted position because each passenger is limited to one-half of the lateral width of a conventional armrest. Thus, adding the concave configuration to the retracted support surface 16 effectively increases the overall armrest surface area without extending the lateral width of the armrest beyond that of a conventional armrest, which is explained in more detail below.

In addition to providing a more ergonomic armrest support, the arrangement of the retracted support surfaces 16 in the retracted position 22 also provides an equivalent and fair share of the armrest 10 to each passenger via the symmetric arrangement of the adjustable components 14 along the base component 12. The retracted position 22 also has a non-intrusive design that maintains a physical barrier between the passenger's arms to prevent intrusion and arm contact between passengers as much as possible, thereby reducing a potential spread of germs between passengers.

In the extended position 24, as best illustrated in FIGS. 4, 8, 11, 13, 15, and 17, the adjustable component 14 may be oriented relative to the base component 12 so that the extended support surface 18 is presented as the contact surface for a passenger's arm, and the retracted support surface 16 is facing downward toward a passenger's leg when the passenger is seated in the passenger seat 1. In some embodiments, the extended support surface 18 has a flat configuration similar to that of a conventional armrest surface.

As illustrated in FIGS. 4, 8, 11, 13, 15, and 17, the extended support surface 18 extends the lateral width of the armrest beyond that of a conventional armrest. In the extended position 24, the retracted support surface 16 may provide additional comfort to the passenger by providing a concave surface that better contours to the rounded shape of the passenger's leg that is likely located below the adjustable component 14 in the extended position 24.

In some embodiments, such as those shown in FIGS. 2-4, 6-8, and 10-11, the height of the support surface of the armrest 10 in both the retracted position 22 and the retracted position 24 remains approximately the same. The continuity in the height in both positions 22, 24 can be more ergonomic by allowing the passenger to maintain the same seated position when using the armrest 10.

In order to facilitate rotation of the adjustable component 14 between positions, as shown in FIGS. 2-4 and 6-11, a portion 28 of the adjustable component 14 may be positioned within a recessed area 20 of the base component 12 that houses the pivot location 26. The portion 28 may have a rounded contour that allows it to more easily move within the recessed area 20 without binding against any surfaces within the recessed area 20. In other embodiments, the portion 28 can have a circular, elliptical, polygonal, or any other suitable shape that does not bind against any surfaces within the recessed area 20. For example, the bottom surface could be removed (as it is not visible by passengers), in which case there would be no constraint on binding.

Figure 7:
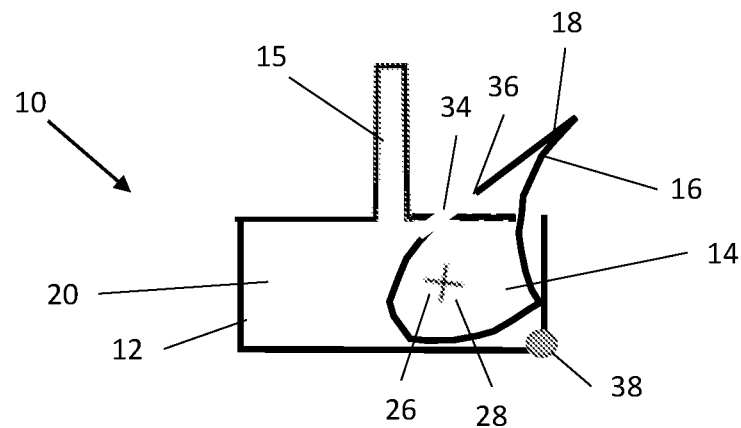
FIG. 7 is an end view of the shareable armrest of FIG. 6 with one adjustable component transitioning between a retracted position and an extended position.
Figure 8:
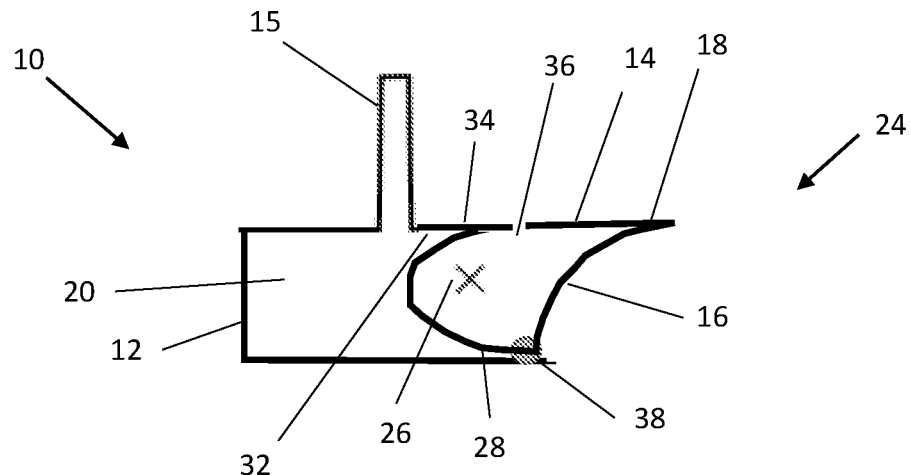
FIG. 8 is an end view of the shareable armrest of FIG. 6 with one adjustable component in an extended position.

As a result, as illustrated in FIGS. 6-8, when the adjustable component 14 is rotated into the extended position 24, some of the rounded surface of the portion 28 is also rotated out of the recessed area 20 which can result in the formation of a gap 32 between the extended support surface 16 and the divider 15. A cover 34 may be positioned over the gap 32 to provide a smooth surface to support a passenger's arm. The adjustable component 14 may have an opening or slit 36 that is shaped to receive the cover 34 and allow the adjustable component 14 to slide over the cover 34 as it rotates upward into the retracted position 22.

In other embodiments, the cover 34 may be attached to the adjustable component 14 in such a way that allows the cover 34 to move into position over the gap 32, such as with a spring-loaded connection that holds the cover 34 in a horizontal position over the gap 32 in the extended position 24 and then releases the cover 34 when the adjustable component 14 rotates into the retracted position 22. Any other suitable configuration of the adjustable component 14 may be utilized that provides a comfortable and supported surface in the extended position 24.

According to some embodiments, as shown in FIGS. 6-8, the adjustable component 14 may be held in the extended position 24 through the use of one or more stop mechanisms 38, which prevent further rotation or other movement of the adjustable component 14 in the extended direction. In further embodiments, the mechanism 38 may be located in the gap 32 (identified in FIG. 8).

As illustrated in FIG. 9, the adjustable component 14 may be held in the retracted position 24 through the use of a retention device 40 (including but not limited to one or more springs, latches, clasps, hook and loop fasteners, or other suitable releasable connection devices) to releasably hold the adjustable component 14 in place. A person of ordinary skill in the relevant art will understand that any suitable device may be used that can maintain the adjustable component 14 in the retracted position 22 until the passenger wishes to deploy it into the extended position 24.

In some embodiments, as shown in FIGS. 2-4, 6-8, 10-11, the arc of rotation of the adjustable component 14 between the retracted position 22 and the extended position 24 is approximately 90 degrees. However, the arc may be more or less than 90 degrees, depending on the location and configuration of the retracted support surface 16 and the extended support surface 18 with respect to the overall geometry of the adjustable component 14, the configuration of the base component 12, and the configuration of the stop mechanism 38.

In certain embodiments, as illustrated in FIG. 2 and as described above, the completely retracted position 22 of the armrest 10 (meaning both of the adjustable components 14 are in the retracted position 22) comprises a width ($w_{ac}$). $w_{ac}$ is the sum of the width of the retracted position 22 of each adjustable component 14 ($w_{fc}$) plus a width of the divider 15. If the divider 15 is not present, then $w_{ac}=2*w_{fc}$. In certain embodiments, the value of $w_{ac}$ may remain approximately the same as the width dimension for conventional shareable armrests, which currently is approximately 2 inches for economy class passenger seats. In other embodiments, the value of $w_{ac}$ may be smaller or larger than the width dimension for conventional shareable armrests.

Figure 4:
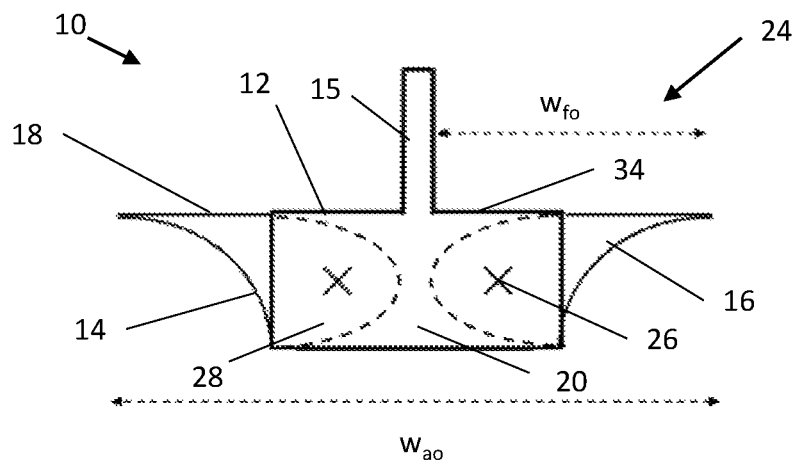
FIG. 4 is an end view of the shareable armrest of FIG. 2 with both adjustable components in an extended position.
Figure 5:
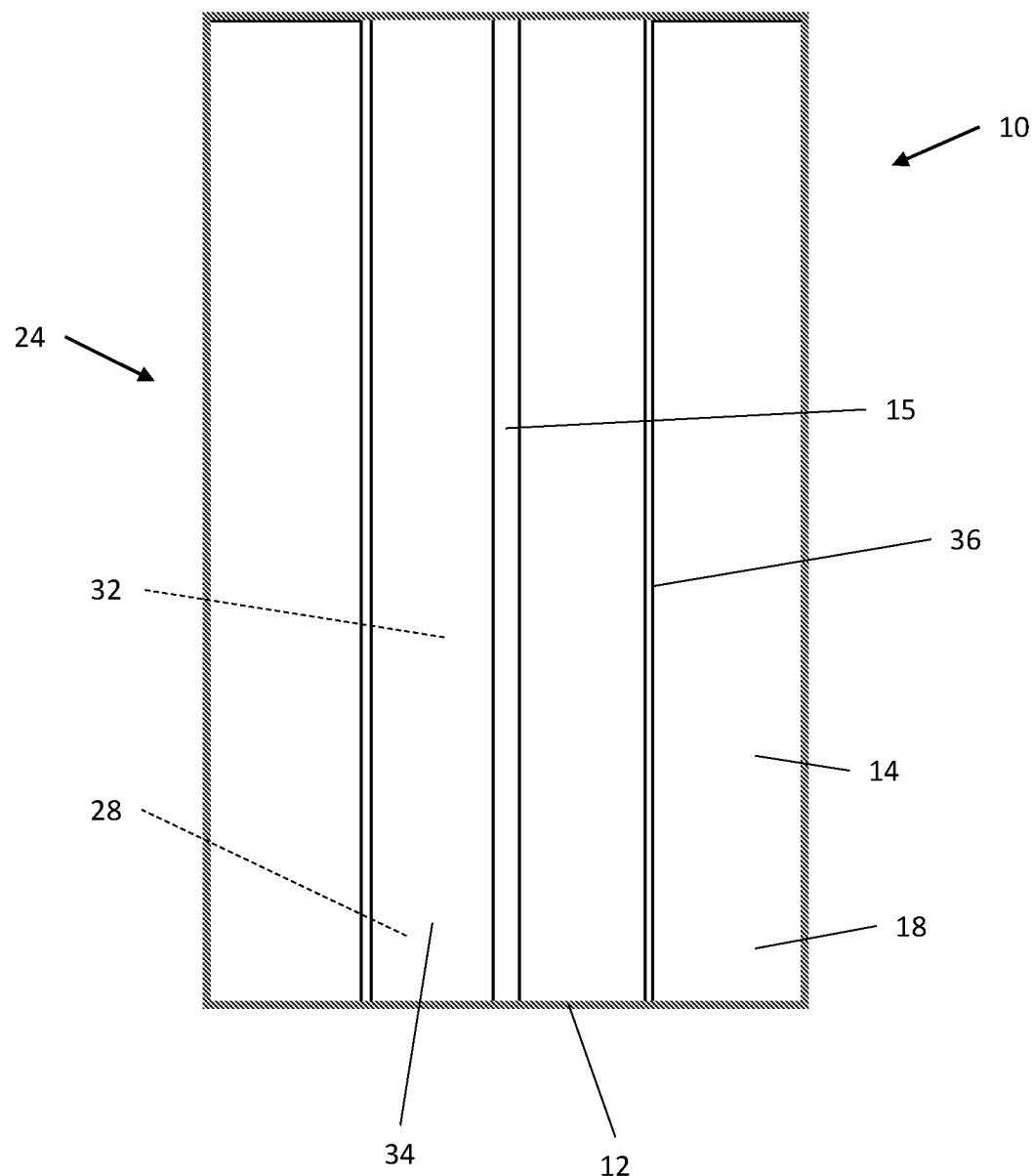
FIG. 5 is a top view of the shareable armrest of FIG. 2 with both adjustable components in an extended position.

In certain embodiments, as illustrated in FIG. 4 and as described above, the completely extended position 24 of the armrest 10 (meaning both of the adjustable components 14 are in the extended position 24) comprises a total width ($w_{ao}$). $w_{ao}$ is the sum of the width of the extended position 24 of each adjustable component 14 ($w_{fo}$) plus a width of the divider 15. If the divider 15 is not present, then $w_{ao}=2*w_{fo}$. In certain embodiments, the value of the $w_{ao}$ may depend on the width of the passenger seat and certification limitations. In certain embodiments, the difference between $w_{ao}$ and $w_{ac}$ may be at least 1 inch in certain cases. In other cases, the difference between $w_{ao}$ and $w_{ac}$ may be at least 2 inches, further may be at least 3 inches, and still further may be at least 4 inches.

For example, in some embodiments such as those depicted in FIGS. 2-4, 6-8, and 10-11, the adjustable component 14 is configured and attached to the base component 12 in such a way that the width $w_{fo}$ of the adjustable component 14 is approximately the same as the overall height $h_F$ of the armrest 10. Thus, in these embodiments, the value of $w_{fo}$ may not exceed the maximum allowable height $h_F$ of the armrest 10. In further embodiments, the height $h_F$ may exceed the value of $w_{fo}$, depending on the position of the pivot location 26 within the base component 12.

Generally speaking, the support surface of an armrest may be positioned to comfortably support a passenger's forearms without raising the passenger's shoulders. This height is typically about 7-9 inches above a surface of the passenger seat 1. Thus, the maximum value of $h_F$ (and thus the maximum value of $w_{fo}$ in some embodiments) may not exceed about 10 inches in certain cases, may be further limited to a maximum height of 9 inches, may be further limited to a maximum height of 8 inches, and may be further limited to a maximum height of 7 inches.

An additional limitation on the maximum height $h_F$ of the armrest 10 may be based on regulations concerning how the armrest 10 is raised and stowed between the passenger seat backs. For example, certain guidelines require a bottom side of the armrest 10 to be approximately flush with a front surface of the passenger seat back 1 when the armrest 10 is raised and stowed between the passenger seat backs. If the armrest 10 is also configured so as not to extend past a rear surface of the passenger seat back, then the maximum value of $h_F$ is limited to the overall thickness of the passenger seat back.

Thus, in cases where the passenger seat back thickness is only 6 inches for example, the maximum value of $h_F$ (and thus the value of $w_{fo}$) may not exceed about 6 inches in certain cases. In other cases, the maximum value of $h_F$ (and thus the maximum value of $w_{fo}$ in some embodiments) may be further limited to a maximum height of 5 inches, may be further limited to a maximum height of 4 inches, and may be further limited to a maximum height of 3 inches.

Figure 10:
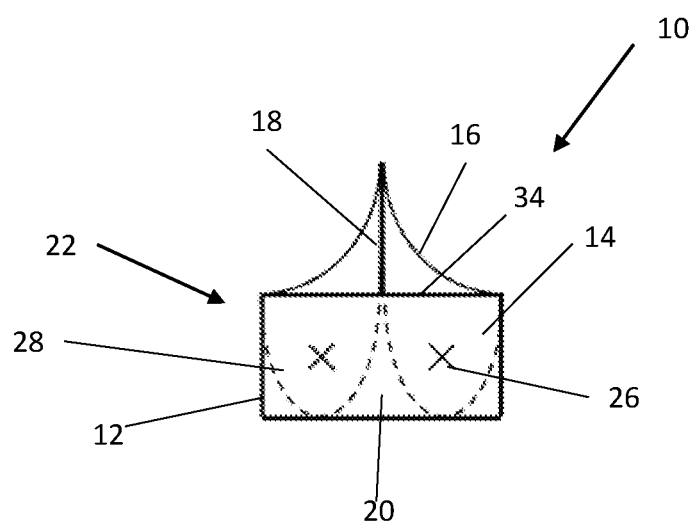
FIG. 10 is an end view of a shareable armrest with both adjustable components in a retracted position, according to certain embodiments of the present invention.
Figure 11:
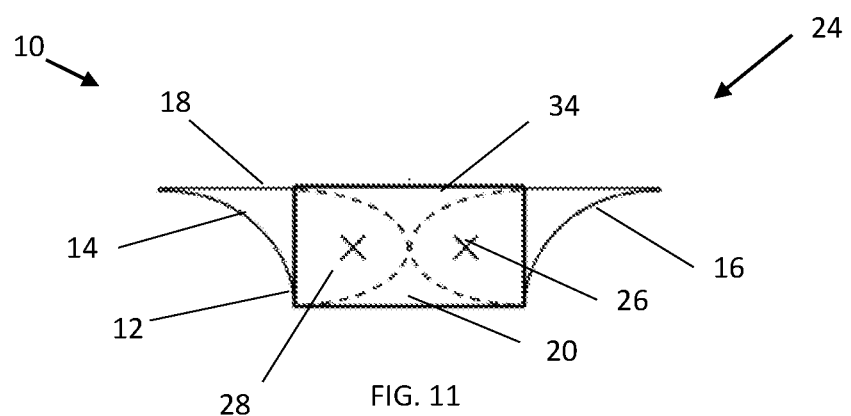
FIG. 11 is an end view of the shareable armrest of FIG. 10 with both adjustable components in an extended position.

Other embodiments of the present invention may utilize pivots or hinges, flaps with flat or concave surfaces, and may be fully or partially non-intrusive. For example, as shown in FIG. 10-11, the armrest 10 may be configured so that the adjustable components 14 form a non-intrusive physical barrier in the retracted position 22, but the armrest 10 does not have a non-intrusive physical barrier in the extended position 24. In these embodiments, this result is accomplished by removing the divider 15 from the base component 12.

Figure 12:
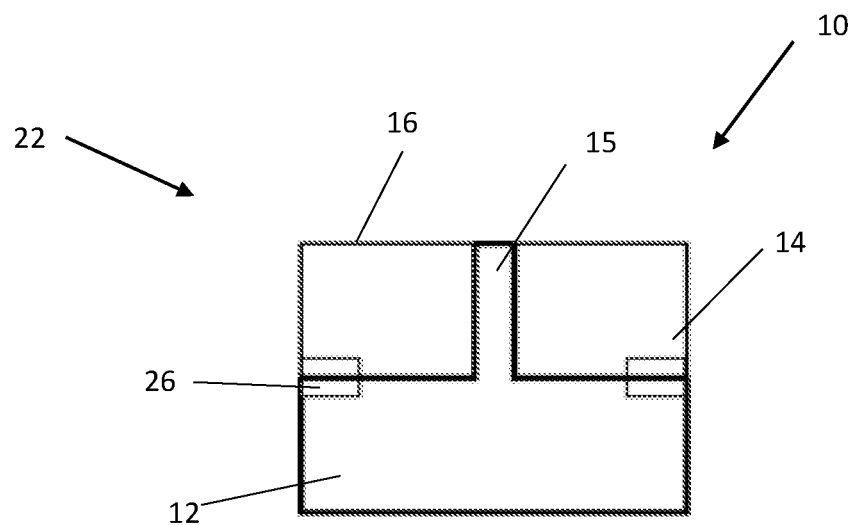
FIG. 12 is an end view of a shareable armrest with both adjustable components in a retracted position, according to certain embodiments of the present invention.
Figure 13:
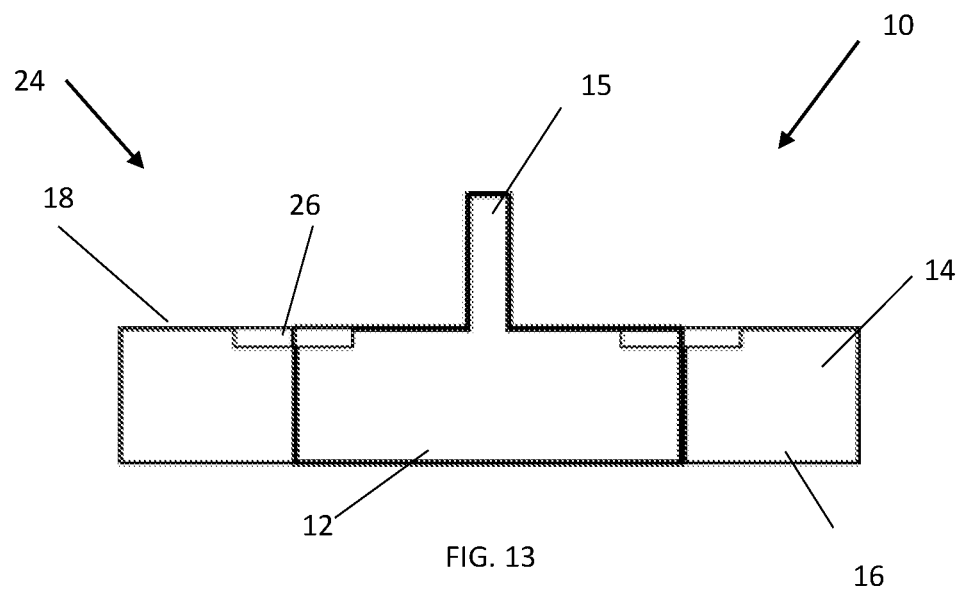
FIG. 13 is an end view of the shareable armrest of FIG. 12 with both adjustable components in an extended position.

In additional embodiments, such as the examples shown in FIG. 12-13, the armrest 10 may be configured so that a non-intrusive physical barrier is present in the extended position 24, but not in the retracted position 22. In these embodiments, this result is accomplished with a configuration where the adjustable components 14 are joined to the base component 12 at a higher pivot location 26. The higher pivot location 26 allows the adjustable components 14 to stow against the divider 15 in the retracted position 22, thereby creating a flat armrest surface that lacks a physical divider in the retracted position 22. In contrast, because of the higher pivot location 26, the adjustable components 14 are able to rotate approximately 180 degrees until the adjustable component 14 is positioned adjacent the base component 12, thereby leaving the divider 15 exposed to form a physical barrier in the extended position 24.

Figure 14:
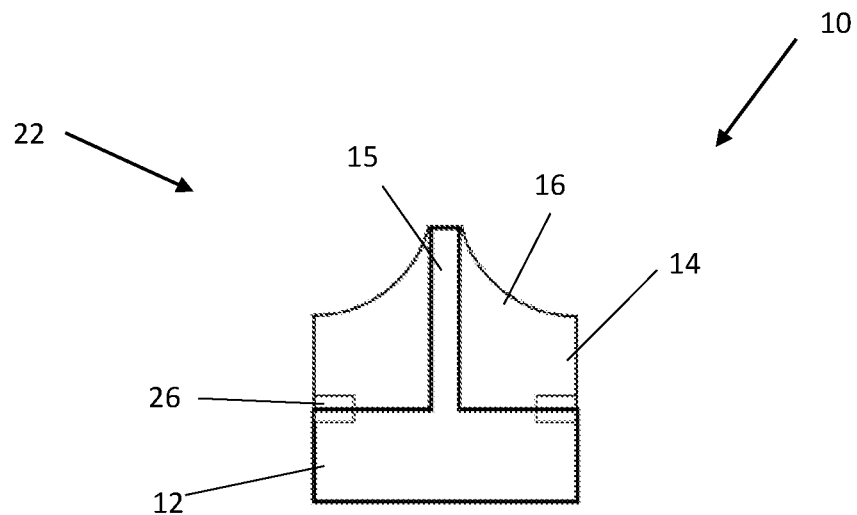
FIG. 14 is an end view of a shareable armrest with both adjustable components in a retracted position, according to certain embodiments of the present invention.
Figure 15:
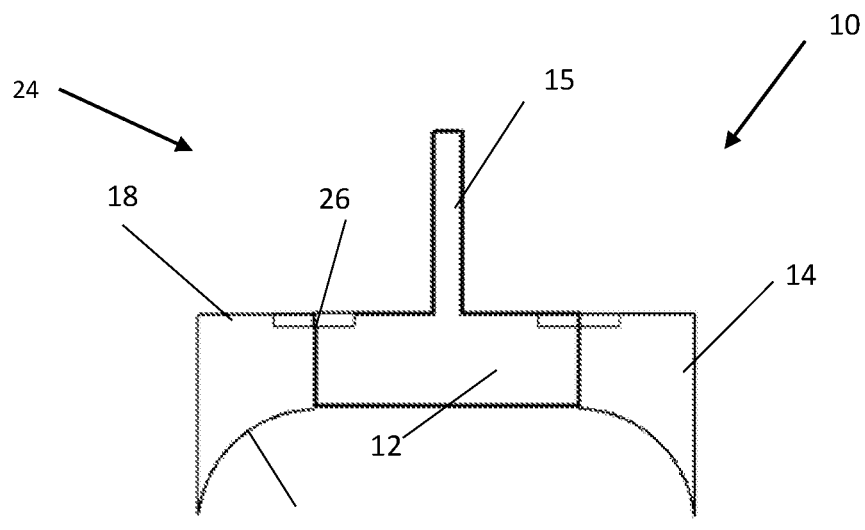
FIG. 15 is an end view of the shareable armrest of FIG. 14 with both adjustable components in an extended position.

In yet other embodiments, such as the examples shown in FIG. 14-15, the armrest 10 may be configured so that a non-intrusive physical barrier is present in the extended position 24 and in the retracted position 22, while also incorporating a higher pivot location 26. In these embodiments, the previous embodiment is modified to increase the height of the divider 15, while also incorporating a concave shape into the adjustable components 14. Like the previous embodiment, the higher pivot location 26 allows the adjustable components 14 to stow against the divider 15 in the retracted position 22 so that the concave shapes of the adjustable components 14 form a physical barrier in the retracted position 22. The adjustable components 14 are then able to rotate approximately 180 degrees until the adjustable component 14 is positioned adjacent the base component 12, thereby leaving the divider 15 exposed to form a physical divider in the extended position 24.

Figure 16:
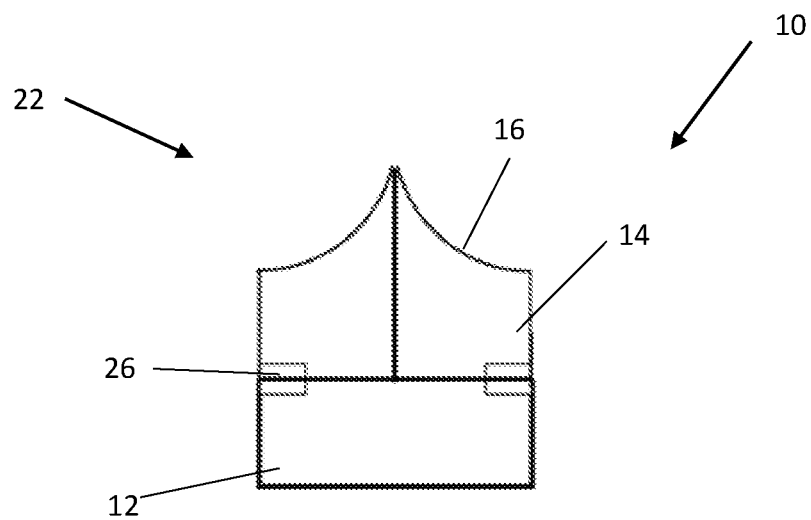
FIG. 16 is an end view of a shareable armrest with both adjustable components in a retracted position, according to certain embodiments of the present invention.
Figure 17:
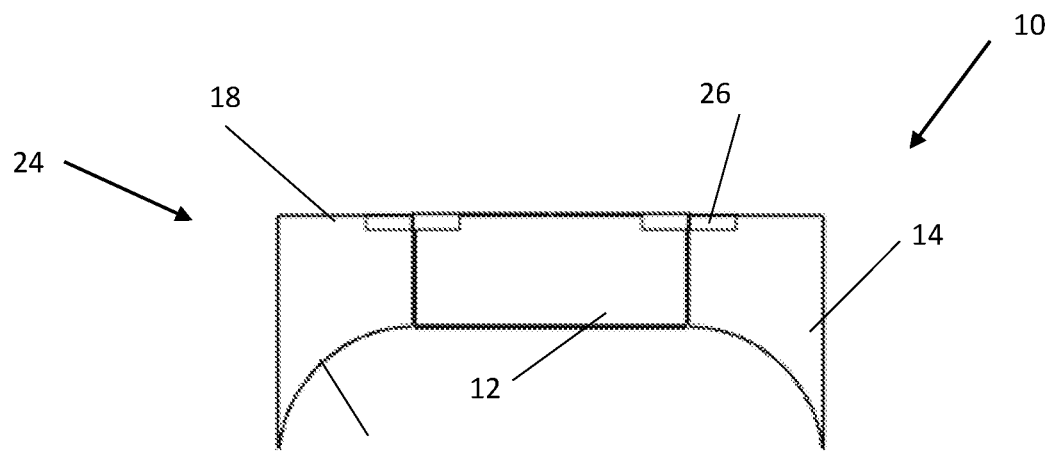
FIG. 17 is an end view of the shareable armrest of FIG. 16 with both adjustable components in an extended position.

In further embodiments, such as the examples shown in FIG. 16-17, the armrest 10 may be configured so that the adjustable components 14 form a non-intrusive physical barrier in the retracted position 22, but the armrest 10 does not have a non-intrusive physical barrier in the extended position 24. In these embodiments, this result is accomplished by removing the divider 15 from the base component 12. Like the previous embodiments, the higher pivot location 26 allows the adjustable components 14 to stow against each other in the retracted position 22 so that the concave shapes of the adjustable components 14 form a physical barrier in the retracted position 22. The adjustable components 14 are then able to rotate approximately 180 degrees until the adjustable component 14 is positioned adjacent the base component 12 in the extended position 24.

In the following, further examples are described to facilitate the understanding of the invention:

Example 1. An armrest for a passenger seat comprising:
- a base component comprising two sides and an upper surface;
- a divider extending upward from the upper surface of the base component;
- at least one adjustable component movably coupled to the base component, the at least one adjustable component comprising a curved retracted support surface and an extended support surface;
- wherein, in a retracted position, the at least one adjustable component is positioned so that the curved retracted support surface extends between an upper end of the divider and an edge of one of the two sides of the base component; and
- wherein, in an extended position, the at least one adjustable component is positioned so that the extended support surface is positioned adjacent one of the two sides of the base component.

Example 2. The armrest of any of the preceding or subsequent examples, wherein the extended support surface is substantially flat.

Example 3. The armrest of any of the preceding or subsequent examples, wherein the extended support surface is arranged to substantially align with the upper surface of the base component.

Example 4. The armrest of any of the preceding or subsequent examples, wherein the extended support surface extends a width of the base component by at least 1 inch.

Example 5. The armrest of any of the preceding or subsequent examples, wherein the curved retracted support surface and the extended support surface are configured to support a passenger's arm at approximately the same height when a passenger is seated in the passenger seat and resting his or her arm on the armrest.

Example 6. The armrest of any of the preceding or subsequent examples, wherein the divider is arranged to form a non-intrusive barrier between passengers' arms when the armrest is positioned between two passenger seats and passengers are seated in the two passenger seats and resting their arms on the armrest.

Example 7. An armrest positioned between two passenger seats, the armrest comprising:
- a base component comprising a divider extending upward from an upper surface of the base component;
- two adjustable components, each adjustable component movably coupled to the base component and configured to convert between a retracted position and an extended position;
- wherein, in the retracted position, two adjustable components and the divider are arranged to form a non-intrusive barrier between passengers' arms when passengers are seated in the two passenger seats and resting their arms on the armrest; and
- wherein, in the extended position, the divider is arranged to form the non-intrusive barrier between the passengers' arms when the passengers are seated in the two passenger seats and resting their arms on the armrest.

Example 8. The armrest of any of the preceding or subsequent examples, wherein each of the two adjustable components comprises a retracted support surface that supports a passenger's arm when a passenger is seated in one of the two passenger seats and resting his or her arm on the armrest when the adjustable component is in the retracted position.

Example 9. The armrest of any of the preceding or subsequent examples, wherein the retracted support surface has a concave shape.

Example 10. The armrest of any of the preceding or subsequent examples, wherein each of the two adjustable components comprises an extended support surface that supports a passenger's arm when a passenger is seated in one of the two passenger seats and resting his or her arm on the armrest.

Example 11. The armrest of any of the preceding or subsequent examples, wherein the extended support surface is substantially flat.

Example 12. The armrest of any of the preceding or subsequent examples, wherein the extended support surface is arranged to substantially align with the upper surface of the base component.

Example 13. The armrest of any of the preceding or subsequent examples, wherein the retracted support surface and the extended support surface are configured to support a passenger's arm at approximately the same height when a passenger is seated in one of the two passenger seats and resting his or her arm on the armrest.

Example 14. The armrest of any of the preceding or subsequent examples, wherein the extended support surface extends a width of the base component by at least 1 inch.

Example 15. An armrest positioned between two passenger seats, the armrest comprising:
- a base component comprising two sides and an upper surface;
- two adjustable components, each adjustable component movably coupled to the base component and configured to convert between a retracted position and an extended position;
- wherein, in the retracted position, two adjustable components are arranged to form a non-intrusive barrier between arms of passengers when passengers are seated in the two passenger seats and resting their arms on the armrest; and
- wherein, in the extended position, the two adjustable components are positioned so that an extended support surface of each of the two adjustable components is positioned adjacent one of the two sides of the base component.

Example 16. The armrest of any of the preceding or subsequent examples, wherein each adjustable component comprises a retracted support surface that supports a passenger's arm when a passenger is seated in in one of the two passenger seats and resting his or her arm on the armrest when the adjustable component is in the retracted position.

Example 17. The armrest of any of the preceding or subsequent examples, wherein the retracted support surface has a concave shape.

Example 18. The armrest of any of the preceding or subsequent examples, wherein the retracted support surface and the extended support surface are configured to support a passenger's arm at approximately the same height when a passenger is seated in in one of the two passenger seats and resting his or her arm on the armrest.

Example 19. The armrest of any of the preceding or subsequent examples, wherein the extended support surface is arranged to substantially align with the upper surface of the base component.

Example 20. The armrest of any of the preceding or subsequent examples, wherein the extended support surface extends a width of the base component by at least 1 inch.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An armrest for a passenger seat comprising:
   - a base component comprising two sides and an upper surface;
   - a divider extending upward from the upper surface of the base component and comprising an upper end at a height above the upper surface;
   - at least one adjustable component movably coupled to the base component, the at least one adjustable component comprising a curved retracted support surface and an extended support surface;
   - wherein, in a retracted position, the at least one adjustable component is positioned so that the curved retracted support surface extends with a non-linear curve between the upper end of the divider and an edge of one of the two sides of the base component; and
   - wherein, in an extended position, the at least one adjustable component is positioned so that the extended support surface is positioned adjacent one of the two sides of the base component.

2. The armrest of claim 1, wherein the extended support surface is substantially flat.

3. The armrest of claim 2, wherein the extended support surface is arranged to substantially align with the upper surface of the base component.

4. The armrest of claim 3, wherein the extended support surface extends wider than a width of the base component by at least 1 inch.

5. The armrest of claim 1, wherein the curved retracted support surface and the extended support surface are configured to support an arm of a passenger at approximately a same height when the passenger is seated in the passenger seat and resting the arm on the armrest.

6. The armrest of claim 1, wherein the divider is arranged to form a non-intrusive barrier between the two sides.

7. An armrest positioned between two passenger seats, the armrest comprising:
- a base component comprising a divider extending upward from an upper surface of the base component;
- at least one adjustable component coupled to the base component, the at least one adjustable component movable relative to the base component between a retracted position and an extended position, each adjustable component comprising a concave support surface;
- wherein, in the retracted position, the at least one adjustable component and the divider are arranged to form a non-intrusive barrier between opposing sides of the base component and the concave support surface extends to an upper end of the divider and with a non-linear curvature in a lateral direction relative to a length of the armrest; and
- wherein, in the extended position, the divider is arranged to form the non-intrusive barrier.

8. The armrest of claim 7, wherein concave support surface is configured to support an arm of a passenger when the passenger is seated in one of the two passenger seats and resting the arm on the armrest when the at least one adjustable component is in the retracted position.

9. The armrest of claim 7, wherein the at least one adjustable component further comprises an extended support surface.

10. The armrest of claim 9, wherein the extended support surface extends wider than a width of the base component by at least 1 inch.

11. The armrest of claim 9, wherein the extended support surface is substantially planar.

12. The armrest of claim 9, wherein the extended support surface is arranged to substantially align with the upper surface of the base component when the at least one adjustable component is in the extended position.

13. The armrest of claim 12, wherein the concave support surface and the extended support surface are configured to support an arm of a passenger at approximately a same height when the passenger is seated in one of the two passenger seats and resting the arm on the armrest.

14. An armrest positioned between two passenger seats, the armrest comprising:
- a base component comprising two sides and an upper surface;
- at least one adjustable component coupled to the base component, the at least one adjustable component movable relative to the base component between a retracted position and an extended position, the at least one adjustable component comprising a curved retracted support surface with a non-linear curvature;
- wherein, in the retracted position, the at least one adjustable component is arranged to form a non-intrusive barrier between the two sides of the base component of the armrest and such that the curved retracted surface faces upwards; and
- wherein, in the extended position, the at least one adjustable component is positioned so that the curved retracted support surface faces downwards.

15. The armrest of claim 14, wherein the at least one adjustable component further comprises an extended support surface, wherein the retracted support surface and the extended support surface are configured to support the arm at approximately a same height.

16. The armrest of claim 14, wherein the at least one adjustable component further comprises an extended support surface, wherein the extended support surface is arranged to substantially align with the upper surface of the base component.

17. The armrest of claim 14, wherein the at least one adjustable component further comprises an extended support surface, wherein the extended support surface extends wider than a width of the base component by at least 1 inch.

* * * * *